(No Model.)

J. H. GOODFELLOW.
Stove Pipe Damper.

No. 239,765. Patented April 5, 1881.

ATTEST:
James H. Slade,
Willard M. Howe.

INVENTOR:
John H. Goodfellow
By James T. Goodfellow
Attorney

UNITED STATES PATENT OFFICE.

JOHN H. GOODFELLOW, OF TROY, NEW YORK, ASSIGNOR TO WILLIAM F. GREENE, OF SAME PLACE.

STOVE-PIPE DAMPER.

SPECIFICATION forming part of Letters Patent No. 239,765, dated April 5, 1881.

Application filed February 4, 1881. (No model.)

*To all whom it may concern:*

Be it known that I, JOHN H. GOODFELLOW, of the city of Troy, in the county of Rensselaer and State of New York, have invented certain new and useful Improvements in Stove-Pipe Dampers, set forth in the following specification and claims, reference being had to the accompanying drawings, in which—

Figure 1:
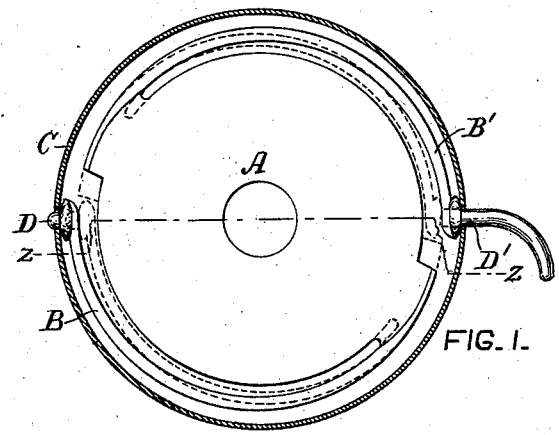
Figure 2:
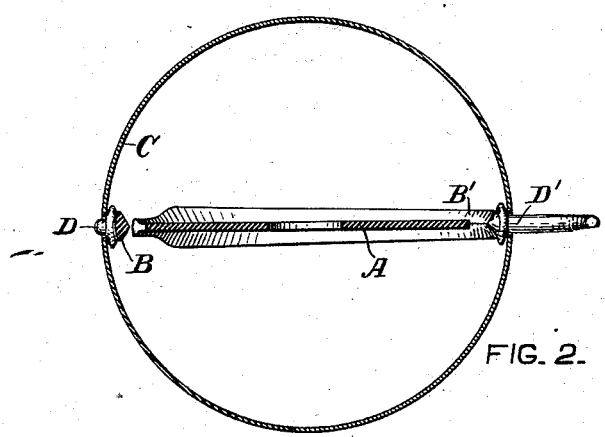
Figure 3:
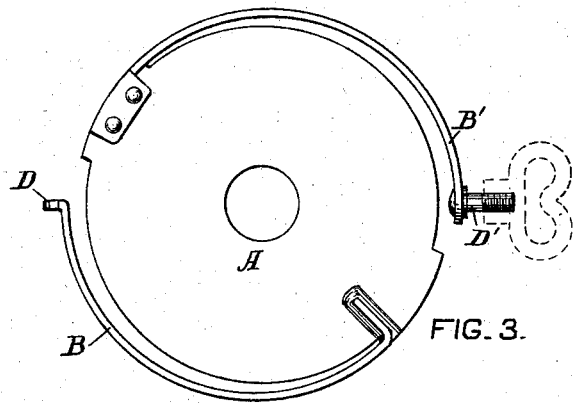

Figure 1 is a transverse section of a pipe with a plan view of my invention therein. Fig. 2 is a like section of a pipe and a section of my invention therein as taken at the line *z z* in Fig. 1. Fig. 3 is a plan view of my invention, showing modifications therein.

My invention relates to that class of dampers that are usually made in the form of a disk and are supported in their places in stove-pipes by means of radially-projecting pivots on opposite sides, on the peripheries of such dampers, upon which pivots such dampers are turned or inclined to regulate the draft in such pipes; and my said invention has for its objects the production of sufficient friction against the pipe, at its places of support, to hold it at any angle at which it may be set, convenience of insertion in its place in the pipe, adaptation to use in stove-pipes, varying somewhat in size, simplicity of construction, and cheapness of production.

In the several figures aforesaid, in which like characters refer to similar parts, A is a disk-like body-portion of a damper. B and B' are springs, each shaped and arranged to conform to or circumscribe a portion of the periphery of the damper, being firmly connected at one end to the disk A, and having its other end free to press against the inner surface of the stove-pipe C at one of the pivots of the damper, the friction thereby produced retaining the damper in whichever position it may be set.

The spring B or B', (when but one such spring is employed,) or both such springs, I make of any suitable known material, and cast in or otherwise secure the same to the body of the damper, Fig. 3; but I preferably make such spring or springs of the same material and in one piece with the body of the damper, so that in casting the same the labor will be no more than in a damper without such spring or springs thereon.

By providing the damper with the spring B, having the pivot D thereon, or the spring B' and pivot D' thereon, or both such springs, with a damper-pivot on each thereof, such pivot or pivots being secured to or made solid and in one piece with the free end of such spring or springs, the spring or springs B B', by being forced inward, as indicated by dotted lines in Fig. 1, the pivot D can be entered in its place in the pipe C without altering the shape of the pipe in so doing, and the damper is also thereby adapted to closely fit at its bearings, and to retain itself in place in stove-pipes of somewhat different diameters.

What I claim as my invention is.

1. A stove-pipe damper provided with a spring conforming to or circumscribing a portion of the periphery of such damper, substantially as specified.

2. A stove-pipe damper provided with springs B B', each conforming to or circumscribing a portion of the periphery of such damper, substantially as shown and described.

3. A stove-pipe damper provided with a spring having a pivot of the damper on such spring, substantially as set forth.

4. A stove-pipe damper provided with springs B B', having thereon the pivots D D', substantially as shown and described.

5. A stove-pipe damper provided with supporting-pivots and a spring or springs shaped and arranged as described, all made of the same material and in one piece, substantially as shown and specified.

In testimony whereof I hereunto set my hand in the presence of two subscribing witnesses this 27th day of January, 1881.

JOHN H. GOODFELLOW.

Witnesses:
JAMES H. SLADE,
JAMES T. GOODFELLOW.